United States Patent
Rice (10) Patent No.: US 10,005,687 B1
(45) Date of Patent: Jun. 26, 2018

(54) DISSOLVED AIR FLOTATION SYSTEM

(71) Applicant: Hydro Treatment Technologies, LP, Blossburg, PA (US)

(72) Inventor: David B. Rice, Vero Beach, FL (US)

(73) Assignee: Hydro Treatment Technologies, LP, Blossburg, PA (US)

( * ) Notice: Subject to any disclaimer, the term of this patent is extended or adjusted under 35 U.S.C. 154(b) by 664 days.

(21) Appl. No.: 14/171,725

(22) Filed: Feb. 3, 2014

(51) Int. Cl.
| | |
|---|---|
| C02F 1/24 | (2006.01) |
| C02F 9/00 | (2006.01) |
| C02F 1/52 | (2006.01) |
| B03D 1/14 | (2006.01) |

(52) U.S. Cl.
CPC .......... *C02F 9/00* (2013.01); *C02F 1/24* (2013.01); *C02F 1/52* (2013.01); *B03D 1/1431* (2013.01)

(58) Field of Classification Search
None
See application file for complete search history.

(56) References Cited

U.S. PATENT DOCUMENTS 6,017,449 A * 1/2000 Eriksson ............... C02F 1/24
   210/194
2010/0314324 A1* 12/2010 Rice ..................... B03D 1/1431
   210/706

FOREIGN PATENT DOCUMENTS

JP            09-024362 A  *  1/1997

* cited by examiner

*Primary Examiner* — Thomas M Lithgow
(74) *Attorney, Agent, or Firm* — Carl A. Ronald (57) ABSTRACT

A dissolved gas flotation system including a flotation cell having an inlet and an outlet defining a direction of flow along a longitudinal axis extending from the inlet to the outlet. The flotation cell has a top and a bottom to define a cell depth extending from the top of the flotation cell to the bottom of the flotation cell in a direction of a transverse axis transvers to the longitudinal axis. A first means discharges a first dissolved gas and bubble mix in a first direction adjacent the inlet; and a second means discharge a second dissolved gas and bubble mix in a second direction adjacent the outlet counter-current to the first direction.

16 Claims, 10 Drawing Sheets

DISSOLVED AIR FLOTATION SYSTEM

TECHNICAL FIELD

The present invention relates to water filtration systems. More specifically, the present invention relates to dissolved air flotation (DAF) filtration systems and arrangements of their flotation cell or tank. Specific applications of the preferred system described herein include water filtration applications specific to the oil and gas industry.

BACKGROUND

Generally known DAF systems include a tank into which influent flows for the separation of solid contaminants. One or more discharge devices are distributed about the tank to discharge a dissolved air or gas and water mix into the influent. As the dissolved gas comes out of the gas/water mix or solution, bubbles are formed. Solids in the influent adhere to the bubbles and are carried to the surface of the influent as the bubbles rise thereby separating the solids from the influent to provide the separated clarified water. In known DAF systems, the gas/water solution is discharged from the discharged devices either in the direction of flow or otherwise in a uniform manner through the tank.

Moreover, known systems use a single dissolved air/gas generation source. In order to provide the dissolved gas/water solution, DAF system require a compressed gas source and a water source. The gas and water are mixed under pressure to dissolve the gas in the water. In known DAF systems using multiple devices to discharge the gas/water solution into the influent, each discharge device is connected to the common or single or dissolved air/gas source. One problem with piping from a single source is that there can be a pressure drop or head loss in the transmission or piping lines which can cause variability in the bubbles size when the gas comes out of solution.

The water used to generate the gas/air solution mix can present a limitation to certain applications of the DAF. More specifically, the water in the gas/water solution generation must be of sufficient clarity so as not to damage or plug the gas/water solution equipment, piping or discharge devices. This can present a limitation in using DAF systems at a site, for example at some remote oil drilling sites, in which fresh or sufficiently clarified water is scarce. Alternatively or additionally, providing sufficiently clear water can increase operating cost of the DAF systems.

SUMMARY OF THE INVENTION

Preferred embodiments of DAF systems and methods are presented. Preferred embodiments includes a flotation cell for use in a dissolved gas flotation system. The flotation cell includes an inlet and an outlet to define a direction of flow along a longitudinal axis extending from the inlet to the outlet. The flotation cell has a top and a bottom to define a cell depth extending from the top of the flotation cell to the bottom of the flotation cell in a direction of a transverse axis transvers to the longitudinal axis. A first means for discharging a first dissolved gas and bubble mix in a first direction is preferably disposed adjacent the inlet; and a second means is preferably disposed adjacent the outlet for discharging a second dissolved gas and bubble mix in a second direction counter-current to the first direction.

A preferred embodiment of a dissolved air flotation system includes means for pre-treatment of an influent; means for post-treatment of a clarified water; and a flotation cell. The preferred flotation cell includes an inlet in communication with the pre-treatment means; and an outlet in communication with the post-treatment means, the flotation cell defines a direction of flow along a longitudinal axis extending from the inlet to the outlet. The flotation cell has a top and a bottom to define a cell depth extending from the top of the flotation cell to the bottom of the flotation cell in a direction of a transverse axis transvers to the longitudinal axis. A first air/water distribution manifold is preferably disposed adjacent the inlet coupled to a first dissolved air generator. At least a second air/water distribution manifold is preferably disposed adjacent the outlet and coupled to a second dissolved air generator independent of the first air generator. Each of the first and second air/water distribution manifolds has a discharge opening oriented relative to at least one of the longitudinal axis and the transverse axis to define a discharge of dissolved air and bubble mix having a rate of discharge and a direction. The discharge openings of the first air/water distribution manifold and the second air/water distribution manifold are preferably oriented such that at least a portion of the discharge of dissolved air and bubble mix from the second air/water distribution manifold is counter current to at least a portion of the discharge of dissolved air from the first air/water distribution manifold.

In another preferred embodiment, a mobile dissolved air flotation system includes a primary skid for treating an influent flow ranging from 250-600 GPM. The primary skid preferably includes a heating chamber; a flocculation chamber; a clarified water chamber; and a flotation cell having an inlet in communication with the flocculation chamber and an outlet in communication with the clarified water chamber. The flotation cell defines a direction of flow along a longitudinal axis extending from the inlet to the outlet. The flotation cell has a top and a bottom to define a cell depth extending from the top of the flotation cell to the bottom of the flotation cell in a direction of a transverse axis transvers to the longitudinal axis. A first air/water distribution manifold is preferably disposed adjacent the inlet and at least a second air/water distribution manifold is preferably disposed adjacent the outlet. Each of the first and second air/water distribution manifolds has a discharge opening oriented relative to at least one of the longitudinal axis and the transverse axis to define a discharge of dissolved air having a rate of discharge and a direction. The discharge openings of the first air/water distribution manifold and the second air/water distribution manifold are preferably oriented such that at least a portion of the discharge of dissolved air from the second air/water distribution manifold is counter current to at least a portion of the discharge of dissolved air from the first air/water distribution manifold. A preferred secondary skid includes a first dissolved air generator coupled to the first air/water distribution manifold and a second dissolved air generator independent of the first dissolved air generator coupled to the second air/water distribution manifold.

Preferred methods of dissolved air flotation in a flotation cell includes generating a first dissolved air-water and bubble mixture; generating a second dissolved air-water bubble mixture independent of the first generated dissolved air-water mixture; discharging the first dissolved air-water and bubble mixture in a first direction proximate an inlet of the flotation cell; and discharging the second dissolved air-water and bubble mixture in a second direction counter-current to the first direction.

In one particular embodiment, a method of mobile dissolved air flotation for a fracking operation is provided. The preferred method includes transporting a mobile dissolved air flotation system to a first fracking site; assembling the system and coupling the system to a first influent source at the first tracking site over an 8-12 hours period; and continuously processing the first influent source from the first site at a rate of 250-600 GPM over a 10-12 hour period. The preferred method further includes disassembly of the mobile dissolved air flotation system over an 8-12 hour period; transporting the mobile dissolved air flotation system to a second fracking site; assembling the system and coupling the system to a second influent source at the second tracking site over a 8-12 hours; and continuously processing the second influent source from the second site at a rate of 250-600 GPM over a 10-12 hour period.

BRIEF DESCRIPTION OF THE DRAWINGS

Embodiments of the present invention will be described and explained through the use of the accompanying drawings.

The drawings have not necessarily been drawn to scale. For example, the dimensions of some of the elements in the figures may be expanded or reduced to help improve the understanding of the embodiments of the present invention. Similarly, some components and/or operations may be separated into different blocks or combined into a single block for the purposes of discussion of some of the embodiments of the present invention. Moreover, while the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Figure 1A:
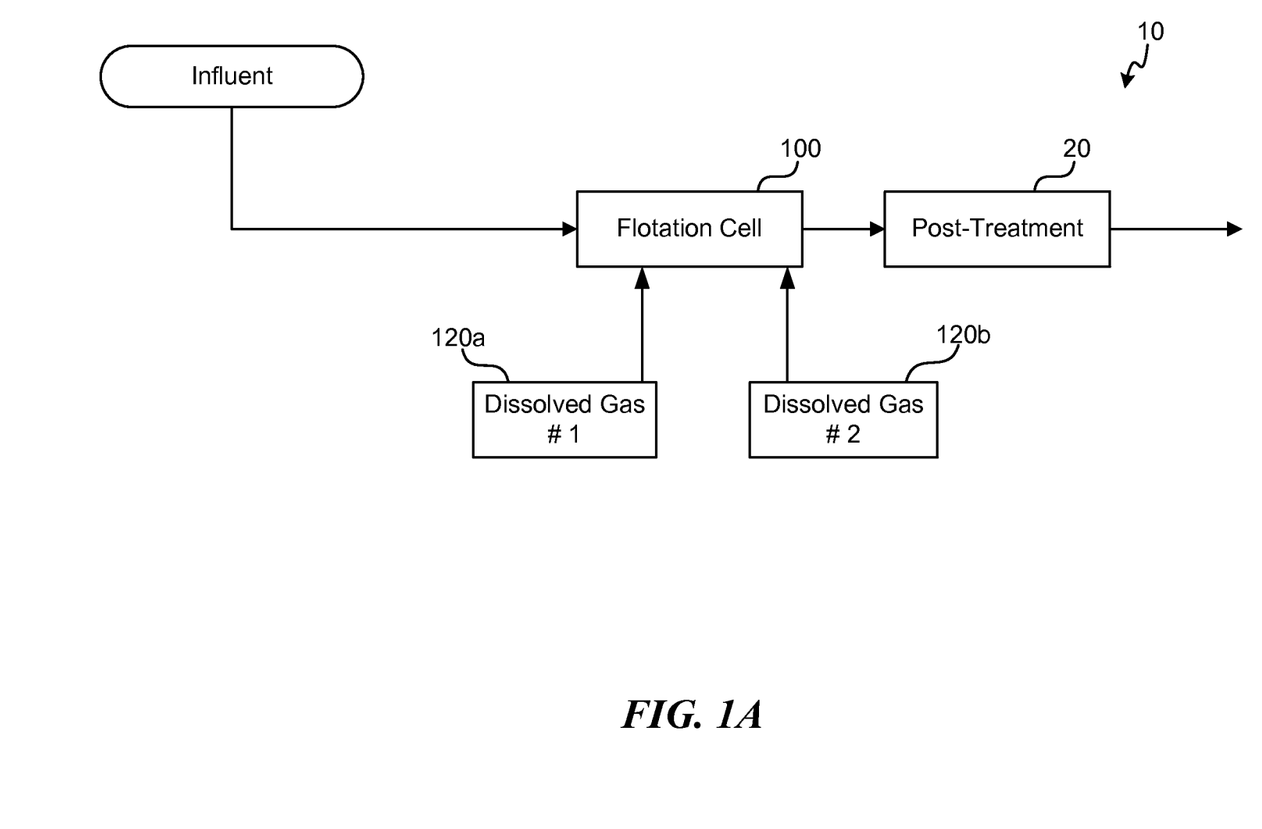
FIG. 1A is a schematic illustration of one embodiment of a preferred dissolved air flotation filtration system.
Figure 1B:
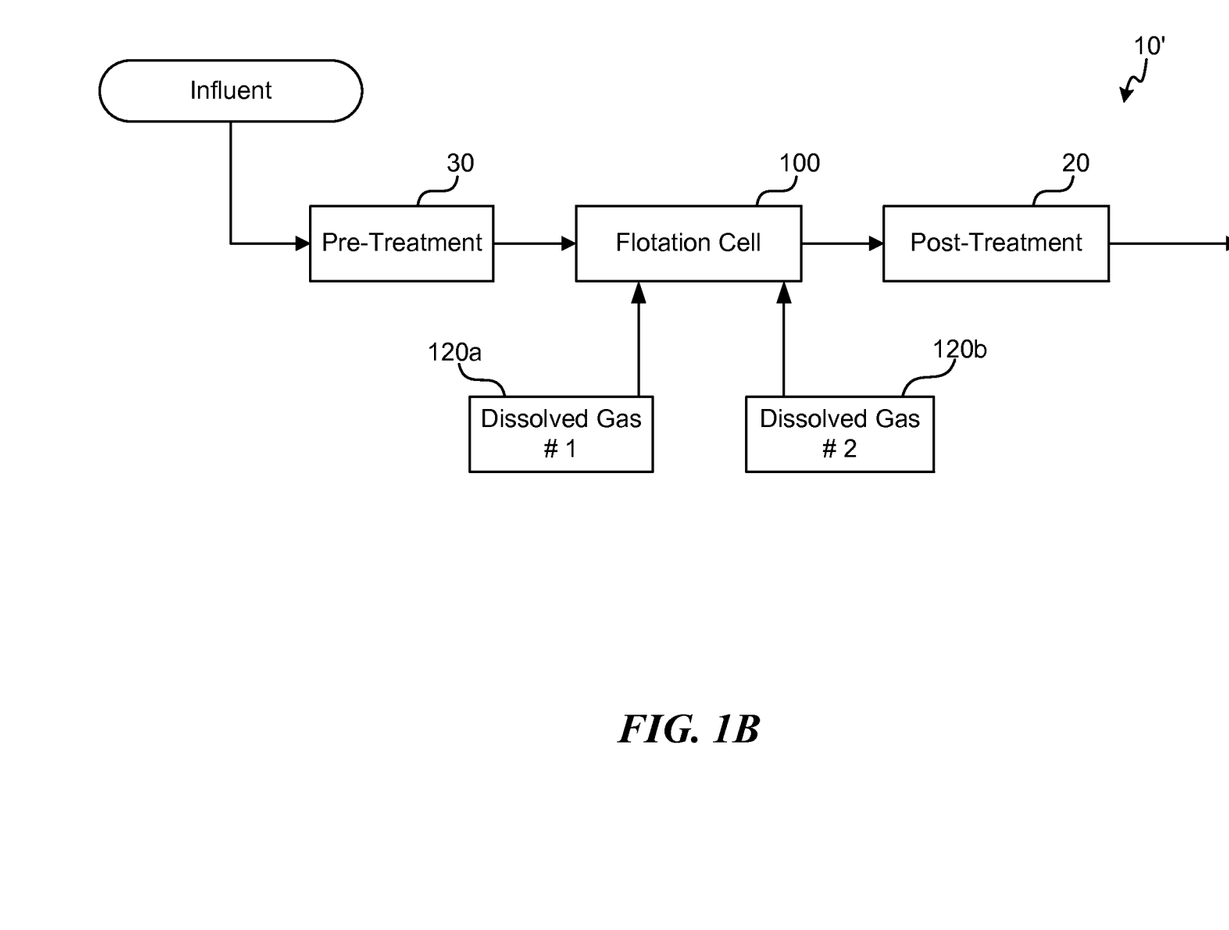
FIG. 1B is a schematic illustration of another embodiment of a preferred filtration system.

Shown in FIGS. 1A & 1B are schematic representations of a dissolved air flotation system (DAF) 10 to provide solids separation of an influent water contaminated with solids and/or oil. The preferred systems described herein are applicable to the oil and gas industry and in particular to fracking and drilling operations. Depending on the application and treatment (fracking water, drilling water, food processing effluent, agricultural waste, etc.) the influent from these operations are typically loaded with solids and oils and can have concentrations of solids ranging from 1000-6000 mg/l, free oil concentrations of between 0-1000 mg/l, and other chemical constituents that can be treated to precipitate out of solution and subsequently removed from the water with this type of treatment system. As a DAF system 10, each system includes a flotation cell using a dissolved gas, preferably air, for separating contaminants from the fluid. Accordingly, as shown in FIG. 1A is one preferred system 10 having a flotation cell 100 into which an influent 12 flows and from which a clarified water effluent is discharged for receipt by means for post-treatment 20 in the system 10. Preferred means for post-treatment can include additional processing components for solids separation from the clarified water including for example, solid media separators and/or centrifuges. Additionally or alternatively, the preferred embodiments of the systems 10 can include means for pre-treatment 30, as seen in FIG. 1A, of the influent to the flotation cell 100. Preferred means for pre-treatment can include processing components to provide initial solids separation, for example, chemical treatment and/or heating for flocculation separation of solids from the influent. In each preferred embodiment of the system 10, 10', the preferred flotation cell 100 includes at least two independent dissolved gas/water discharge assemblies 120a, 120b to generate a cross-current of dissolved gas-water mix within the influent to facilitate solids separation in a manner as described herein.

Figure 2A:
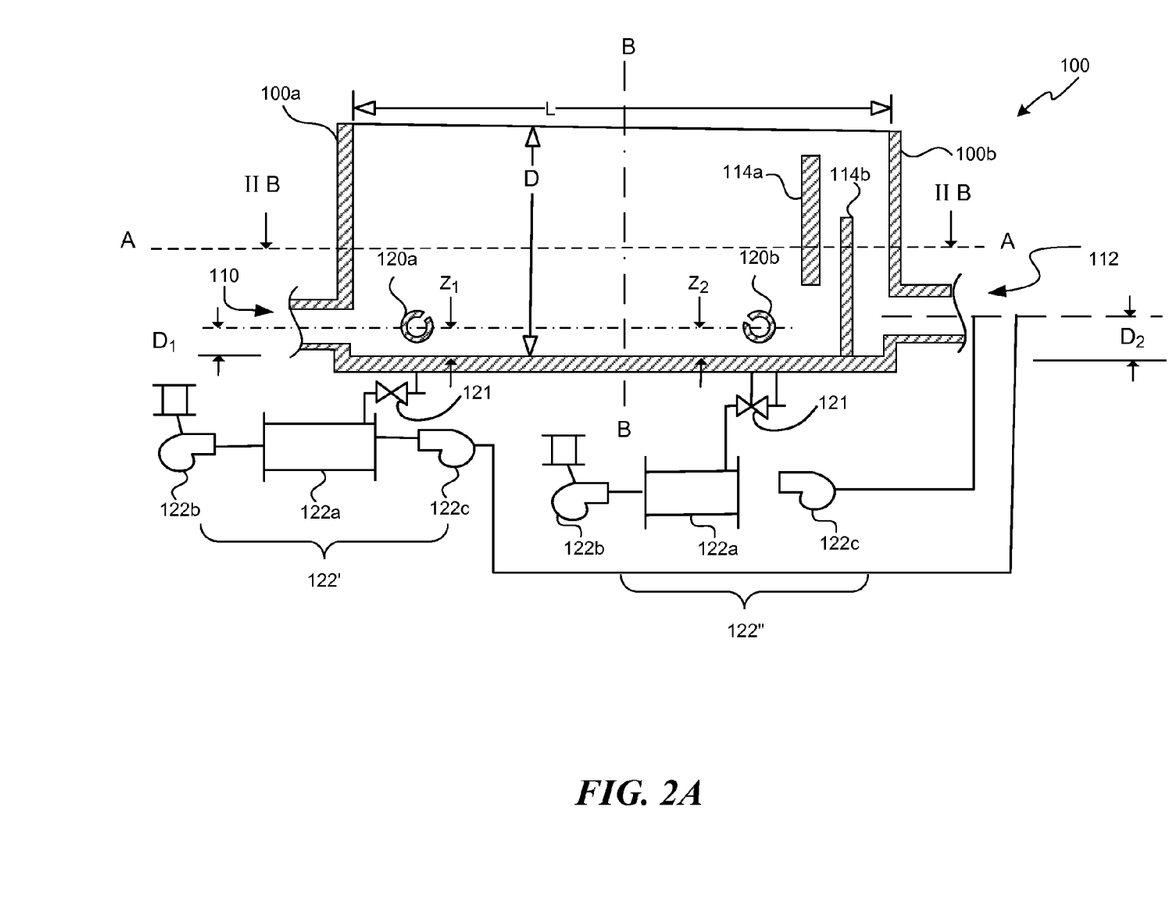
FIG. 2A is a cross-sectional view schematic illustration of a flotation cell taken along line IIA-IIA in FIG. 2B for use in each of the systems of FIGS. 1A and 1B.
Figure 2B:
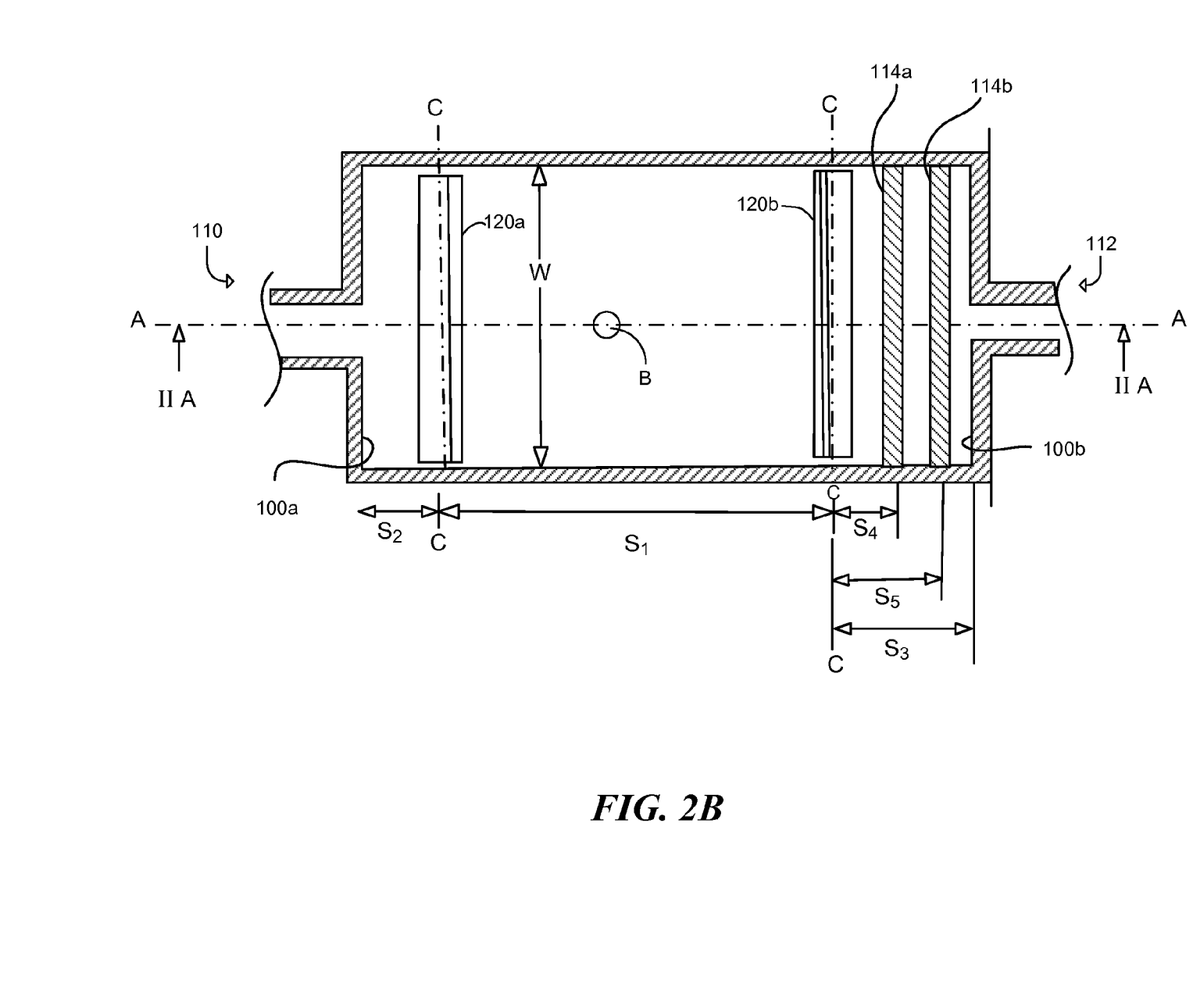
FIG. 2B is a cross-sectional schematic illustration of the flotation cell along line IIB-IIB in FIG. 2B.

Referring now to FIGS. 2A and 2B, shown is a preferred embodiment of the flotation cell 100. The flotation cell 100 is preferably a tank defining a preferred surface area (W×L) of about 100-400 square feet. Internally, the flotation cell 100 is preferably a substantially rectangular prism having a first end 100a and an opposite end 100b to define longitudinal axis A-A of the flotation cell 100. The method described in this embodiment can also be applied to circular DAF systems of both deep and shallow configurations. The flotation cell includes a preferably open top and a bottom surface to define a cell depth D extending from the top of the flotation cell to the bottom of the flotation cell in a direction of a transverse axis B-B transverse to the longitudinal axis. The flotation cell 100 has a preferably constant width W and depth D along a cell length L between the first end 100a and second end 100b. Preferred internal dimensions of the flotation cell are a width W of eight (8) ft.; a depth D of approximately six (6) ft. and a length L of between 20-40 ft. Alternatively, the depth D of the flotation cell 100 can vary in the direction of either one or both of the width W and length L. Further in the alternative, the internal geometry of the flotation cell 100 can be varied for example in shape or dimension provided that the flotation cell 100 arrangement provides for counter-current dissolved gas-water mix to facilitate solids separation as described herein.

The flotation cell 100 includes preferably at the first end 100a an inlet 110 through which the influent is introduced into the cell 100. The influent can be fed directly by the process generating the influent, i.e., the fracking process or alternatively it can be fed from a pre-treatment means as described herein and schematically shown in FIG. 1B. Accordingly, the inlet 110 is in communication with an influent source. The influent source can be from a flowing source or alternatively can be a stagnant source such as for example a holding tank or pond. The influent can be fed by any appropriate mechanical means such as for example, gravity feed or by pump. Preferably, the influent is fed into the flotation cell 100 at a rate ranging from about 250 GPM to about 600 GPM, more preferably ranging from about 250 GPM to about 500 GPM and is even more preferably 250

GPM. The inlet is sized to facilitate the feed rate and is preferably a pipe of a nominal diameter of 4 to 6 inches. The center of the inlet 110 is preferably disposed at a distance from the bottom of about 2-3 feet in a 6 foot' depth tank.

Preferably disposed at the opposite end 100b of the flotation cell 110 is an outlet 112 for discharge of a clarified water effluent from the flotation cell 100. In preferred embodiments of the systems described herein, the outlet 112 is in communication with the post-treatment means, as for example schematically shown in FIGS. 1A and 1B, for post-DAF separation of the clarified water. For example, the outlet 112 can discharge into an effluent holding tank for feeding the post-treatment equipment. The method of discharge for the clarified effluent is typically achieved by the use of an underflow baffle located at the distal end of the tank. The clarified material flows under the baffle and up and over into the clarified liquid storage area. The underflow baffle is typically between 1-2 feet above the bottom of the tank. The direction of flow through the flotation cell 100 is defined by flow from the inlet 110 to the outlet 112. Preferably disposed in the flotation cell 100 and more preferably disposed proximate the outlet 112 are one or more baffles, barriers or weirs 114a, 114b.

Further preferably disposed in the flotation cell 100 are a plurality of two or more means for discharging a mix of dissolved gas-water solution and bubbles into the influent to separate out solids. As explained herein, bubbles of a desired size are generated as the dissolved gas comes out of the water solution. More preferably disposed in the flotation cell 100, is a first air/water distribution manifold 120a adjacent the inlet 110 and a second air/water distribution manifold 120b adjacent the outlet 112. With reference now to FIGS. 2A-2B, the first and second air/water distribution manifolds 120a, 120b are oriented to discharge the dissolved gas-water and bubble mix counter-current to one another. The air/water distribution manifolds 120a, 120b are preferably elongated tubular axial members with their axes of elongation C-C disposed perpendicular to each of the cell longitudinal axis A-A and the transverse axis B-B. The air/water distribution manifolds 120a and 120b are preferably disposed near the bottom surface of the flotation cell 100. The air/water distribution manifolds 120a, 120b can be disposed at equivalent distances from the bottom of the flotation cell 100 or alternatively be disposed at different distances from the bottom of the flotation cell 100. Accordingly, the axes of elongation C-C of the air/water distribution manifolds 120a, 120b preferably respectively define a spaced distance z1, z2 from the bottom of the flotation cell as seen in FIG. 2A. Preferably, the first air/water distribution manifold 120a defines a first spaced distance z1 of 2-3 ft. and the second air/water distribution manifold 120b preferably defines a second spaced distance z2 of 2-3 ft. Additionally, the air/water distribution manifolds 120a, 120b are preferably spaced apart to define a tubular axis-to-axis spacing 51 of approximately 16 feet in a flotation cell with a total length of approximately 20 feet. Moreover, the first air/water distribution manifold 120a defines a preferred spacing S2 from the first end 110a of the flotation tank and is more preferably at a distance S2 of about two (2) feet. The second air/water distribution manifold 120b is preferably spaced from the second end 100b of the flotation cell 100 at a distance S3. In one aspect, the distance S3 can be a function of size of the rear area of the tank relative to the overall size of the cell 100 to serve as the clarified effluent pumping tank. Alternatively or additionally, the second air/water distribution manifold 120b can be preferably spaced from the first weir 114a at a distance S4 of about two (2) feet and/or spaced from the second weir 114b at a distance S5 of about three (3) feet. Although the preferred embodiments of the system 10 are shown with two air/water distribution manifolds, the system can include more than two air/water distribution manifolds with the additional air/water distribution manifolds disposed between the first and second air/water distribution manifolds 120a, 120b provided that the first air/water distribution manifold 120a and the at least second air/water distribution manifold 120b defines the cross-current discharge of dissolved gas-water mix as described herein.

In the preferred embodiments of the system 10, each of the first and second air/water distribution manifold 120a, 120b are coupled to independent dissolved gas-water generators 122', 122" disposed preferably external to the cell 100. Each of the preferred dissolved gas generators 122', 122" (singularly 122) include a cylindrical mixing chamber 122a with a first inlet for a pressurized gas feed 122b and a second inlet for a pressurized water feed 122c. The gas and water are mixed at a preferred gas-to-water pressure ratio to dissolve the gas in the water. In the preferred dissolved gas-water generator 122, the pressurized gas is a compressed air and the pressurized water is pressurized clarified water recycled or discharged from the flotation cell 100. More preferably, the dissolved air-water generator 122 includes, in addition to the cylindrical mixing chamber 122a an air compressor 122b and a feed pump 122c for feeding clarified water from the effluent of the flotation cell 100. In one preferred embodiment, the compressed air is introduced into the mixing chamber 122a at a pressure of 125 psi.; and the clarified water effluent is introduced into the mixing chamber 122a at a pressure of between 50 to 100 psi. The introduction of gas and water at varying pressures sets up or defines a preferred differential pressure in the mixing chamber 122a to dissolve the gas or air into the water. An exemplary embodiment of a dissolved air generator or mixing chamber 122a for use in the preferred system 10 is a "KROFTA AIR DISSOLVING TUBE" as shown and described at page 4 of the KROFTA SUPRACELL brochure which is available at <http://www.kroftaengineering.com/images/supracell.pdf>. The dissolved gas-water mixture exits the mixing chamber 122a via a release valve 121a, 121b (singularly 121) such as for example a globe valve or other flow control valve, for discharge from the manifolds 120a, 120b. The valve 121 is preferably partially opened to apply a backpressure of fluid in the mixing chamber 122a yet permitting a portion of the dissolved gas-water mix to escape. The backpressure facilitates the desired mixing and dissolving of gas in the water within the mixing chamber 122a. The gas-water mixture that escapes past the partially opened valve 121 is exposed to atmospheric pressure and the dissolved gas comes out of solution to generate bubbles of a desired size, preferably less than 5 microns. The mix of dissolved gas-water and bubbles are then preferably discharged from respective air/water distribution manifolds 120a, 120b into the flotation cell 100 to separate solids in a manner as described herein.

Figure 3A:
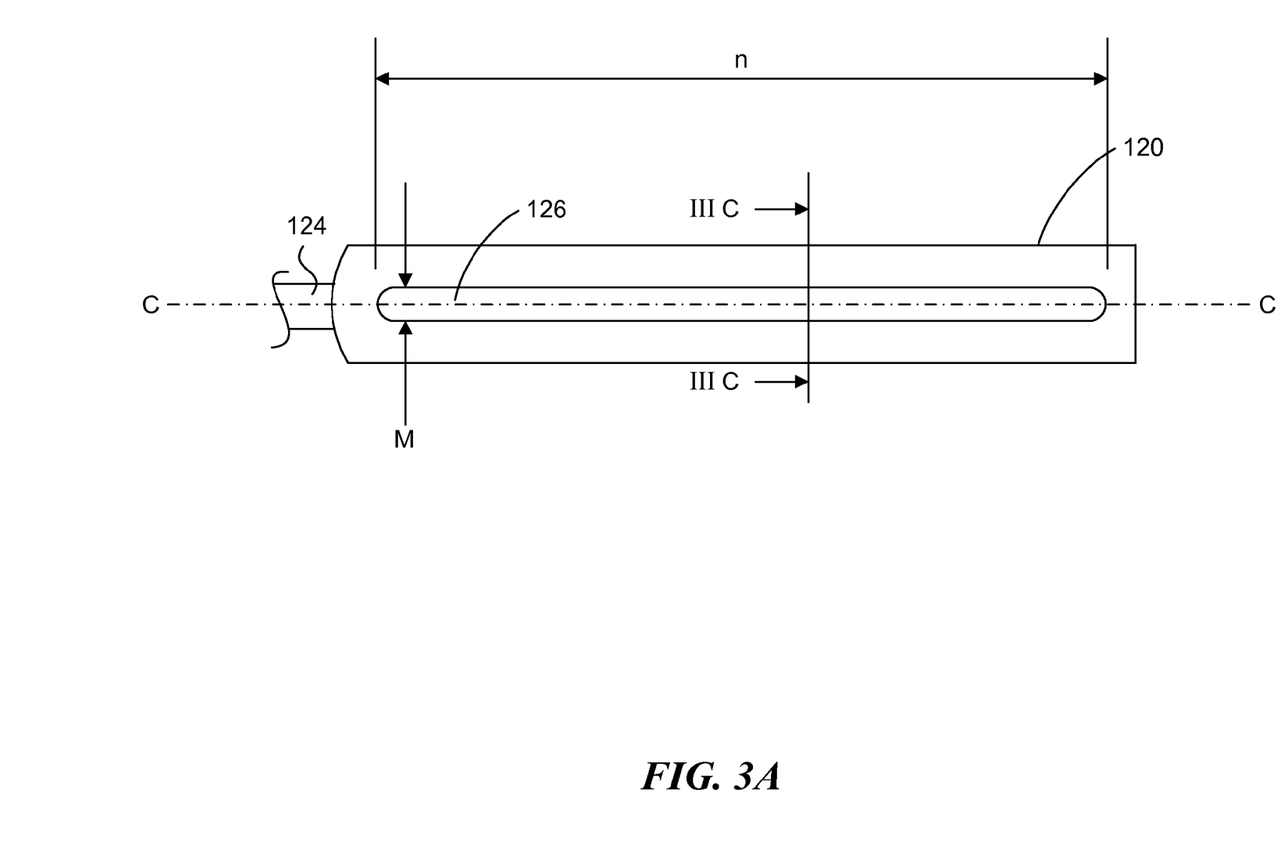
FIGS. 3A-3B are preferred embodiments of an air/water distribution tube for use in the flotation cell of FIGS.
Figure 3B:
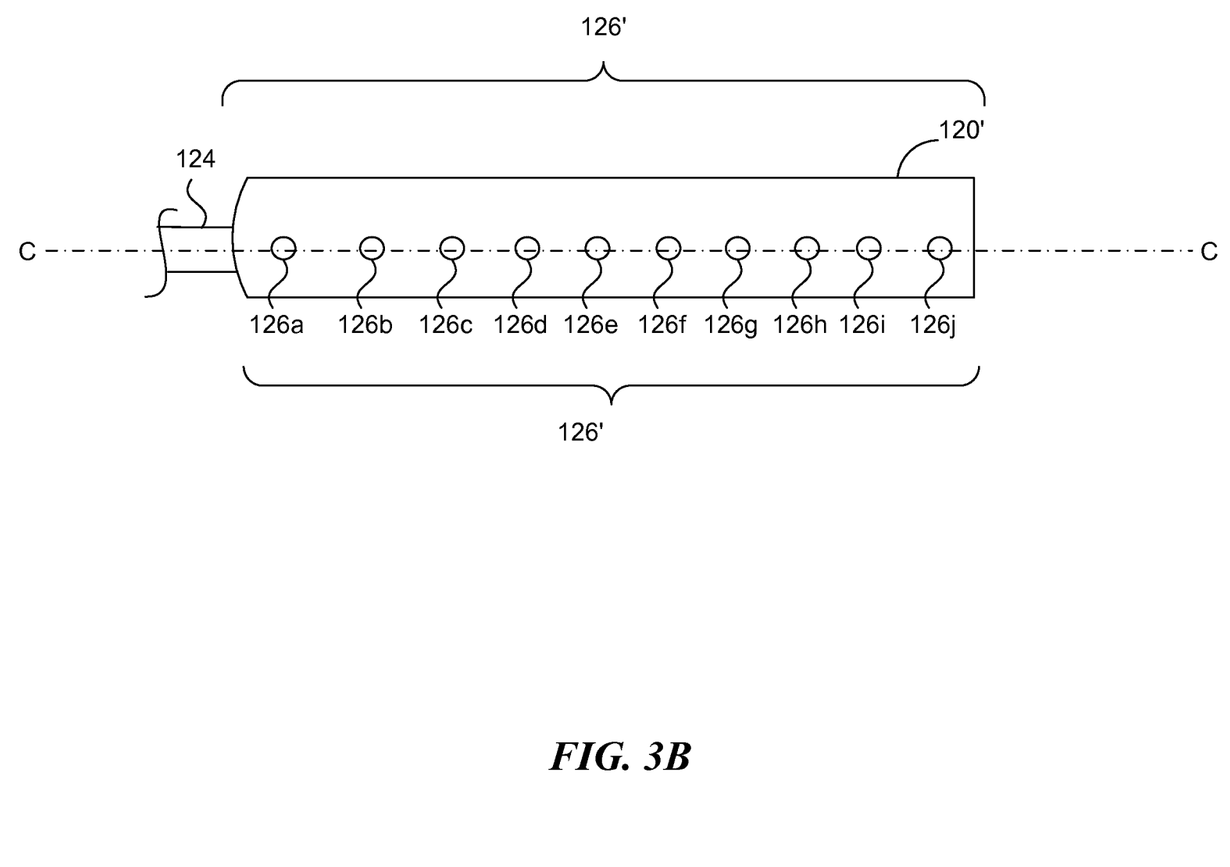

Shown in FIGS. 3A and 3B are preferred air/water distribution manifolds 120, 120' for use in the flotation cell 100. The air/water distribution manifold 120 is preferably elongate and more preferably circular cylindrical defining the longitudinal axis C-C. The air/water distribution manifold 120 includes an intake 124 for coupling to the dissolved gas/air-water generators 122', 122" by appropriate piping or tubing. The preferred air/water distribution manifold 120 preferably includes a discharge opening 126 defined an elongated slit having a width and length for discharge of the dissolved gas-water mix to facilitate a desired bubble size generation for separation of solids in a manner as described herein. The preferred slit 126 can be defined by a plurality of spaced apart slots having a width m of 0.10 to 0.50 inches and independent slot lengths of about 0.50 to 1.5 inches to define an overall slot length n. The slit 126 can be aligned with respect to the elongate axis C-C of the air/water distribution manifold 120 or alternatively be skewed with respect to the axis C-C of elongation. In an alternate embodiment of the tube 120', shown in FIG. 3B, the discharge opening 126' is preferably defined by a combination of oblong openings 126a, 126b, 126c . . . 126j. The openings 126a-126j are preferably circular each having a preferred diameter of about ⅛ to ¼ inches. The openings 126a-126j are substantially linearly aligned and more preferably linearly aligned with the elongate axis C-C or alternatively can be aligned along a line skewed with respect to the elongate axis C-C to collectively define the elongated discharge opening. The dissolved gas/air-water mix is preferably discharged from the air/water distribution manifolds 120 at a preferred with motive force to help push contaminants to the surface and in the desired direction. Gas bubbles in this mixture are typically less than (<) 5 microns in size. Alternatively or in addition to, the dissolved gas/air-water mix is discharged from the air/water distribution manifold at a preferred rate of 75 to 250 GPM depending on the flow capacity of the DAF unit and the size of each air/water distribution manifold. In a preferred embodiment of the system, the first dissolved gas/air distribution manifold 120a discharges the dissolved gas/air-water mix at a rate ranging from about 75-125 GPM; and the second dissolved gas/air distribution manifold 120b discharges the dissolved gas/air-water mix at a rate ranging from about 50-75 GPM.

Figure 3C:
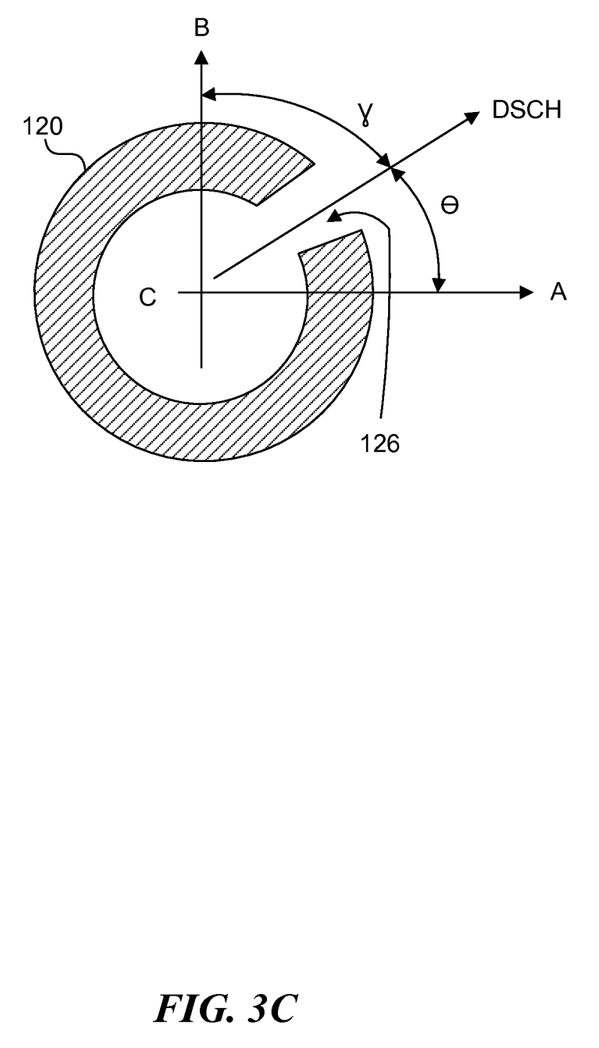
FIG. 3C is a cross-sectional view of the air/water distribution tube of FIG. 3A along line IIIC-IIIC.

In the preferred system 10, the air/water distribution manifolds 120 are oriented to provide for a preferred discharge of the dissolved gas-water and bubble mix. Shown in FIG. 3C is a cross-sectional view of the air/water distribution manifold 120 and its discharge opening 126. The discharge opening 126 defines a discharge axis DSCH to which defines the orientation of the discharge tube to provide a desired discharge. More specifically, the air/water distribution manifold 120 is disposed in the flotation cell 100 to define the direction of discharge of the dissolved gas-water mix. More particularly, the discharge opening 126 and its discharge axis DSCH is oriented relative to one of the longitudinal axis A-A and the transverse axis B-B to provide for the discharge of dissolved gas-water and bubble mix in either the direction of or countercurrent to the direction of influent flow as described herein. As shown in FIG. 3C, the air/water distribution manifold 120 is oriented such that the discharge opening 126 and its axis DSCH defines a preferably acute angle θ with respect to the longitudinal axis A-A or a complimentary acute angle γ with respect to the transverse axis B-B.

Figure 4:
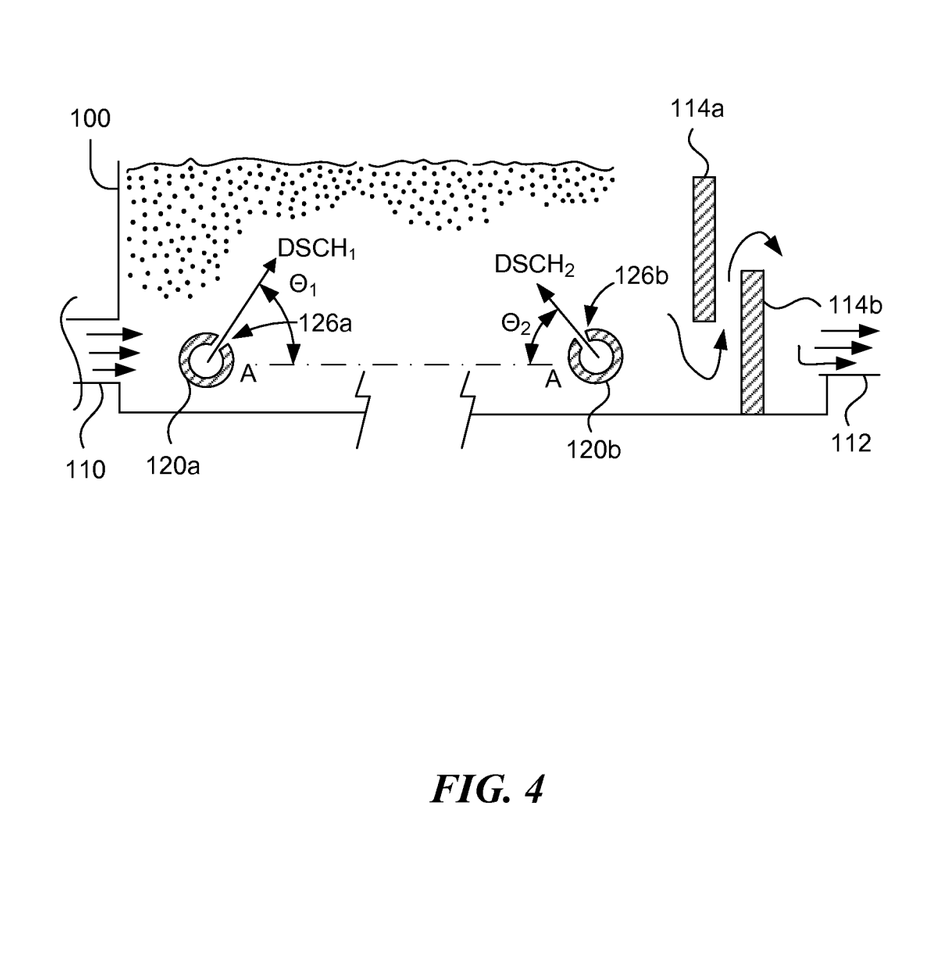
FIG. 4 is a schematic view of operation of a preferred embodiment of a flotation cell for use in the systems of FIGS. 1A-1B.

Shown in FIG. 4 is a schematic representation of operation of the flotation cell 100 with the air/water distribution manifolds 120a, 120b in a desired orientation. Preferably, the discharge opening 126a of air/water distribution manifold 120a opens in the direction of influent flow such that the discharge axis DSCH1 defines a preferred included angle θ1 with the longitudinal axis A-A ranging between 0 to 90 degrees, more preferably ranging from 15 to 55 degrees and is more preferably 45 degrees. The discharge opening 126b of air/water distribution manifold 120b opens in the direction counter-current to influent flow and the discharge of the first air/water distribution manifold 120a such that the discharge axis DSCH2 defines an included angle θ2 with the longitudinal axis A-A ranging between 0 to 90 degrees, more preferably ranging from 15 to 55 degrees and is more preferably 45 degrees. The included angles θ1 and θ2 can be different or may alternatively be different. This countercurrent flow is designed to act as a barrier to exiting solids or contaminants being carried out with the clarified effluent leading to increase the effectiveness of the overall system.

In an exemplary operation, influent enters the flotation cell 100 for flow from the inlet, the contaminated fluid flows from the inlet 110 to the outlet 112. A mix of dissolved gas and bubbles is generated and discharged from the first air/water distribution manifold 120a with the bubbles of a preferred size of less than 5 microns in a manner as previously described. Solids in the influent adhere to the bubbles and are carried to the top of the tank and the upper surface of the influent to separate the solids from the water. As the influent continues to flow toward the outlet 112, heavier solids tend to fall under gravity back into the separated or clarified fluid. Proximate the outlet, the second air/water distribution manifold 120b discharges its preferably independently generated mix of dissolved air-water and bubbles counter-current to the direction of influent flow. Because of the orientation of the air/water distribution manifold 120b and its discharge 126b coupled with the independently generated dissolved air-water mix, the bubbles discharged from the air/water distribution manifold 120b are of a desired size to form a counter-current effective barrier to push the heavier solids back to the upper surface and out of the clarified water. The separated and clarified water flows under and over the weirs 114a, 114b and out the outlet 112. In one preferred operation of the system 10 for fracking, an influent of water with a loading of oil and other fracking byproducts defines a contamination loading of 1000 to 6000 PPM. Influent flows through the flotation cell 100 inlet to and out the outlet 112 at a preferred rate of 250 GPM. The clarified water has a loading of usually less than 5-10 PPM of suspended solids, and varying degrees of other contaminant levels depending on the type of material being processed and chemistries used to complete the treatment. Accordingly, the flotation system 100 can define an efficiency of >99% in regards to suspended solids removal and significant reductions in FOG and COD. When the preferred flotation cell 100 and DAF process are employed in combination with pre-treatment of chemical flocculation, the high efficiency of DAF and solids separation can reduce the amount of flocculation chemicals by 25 to 80%.

Figure 5A:
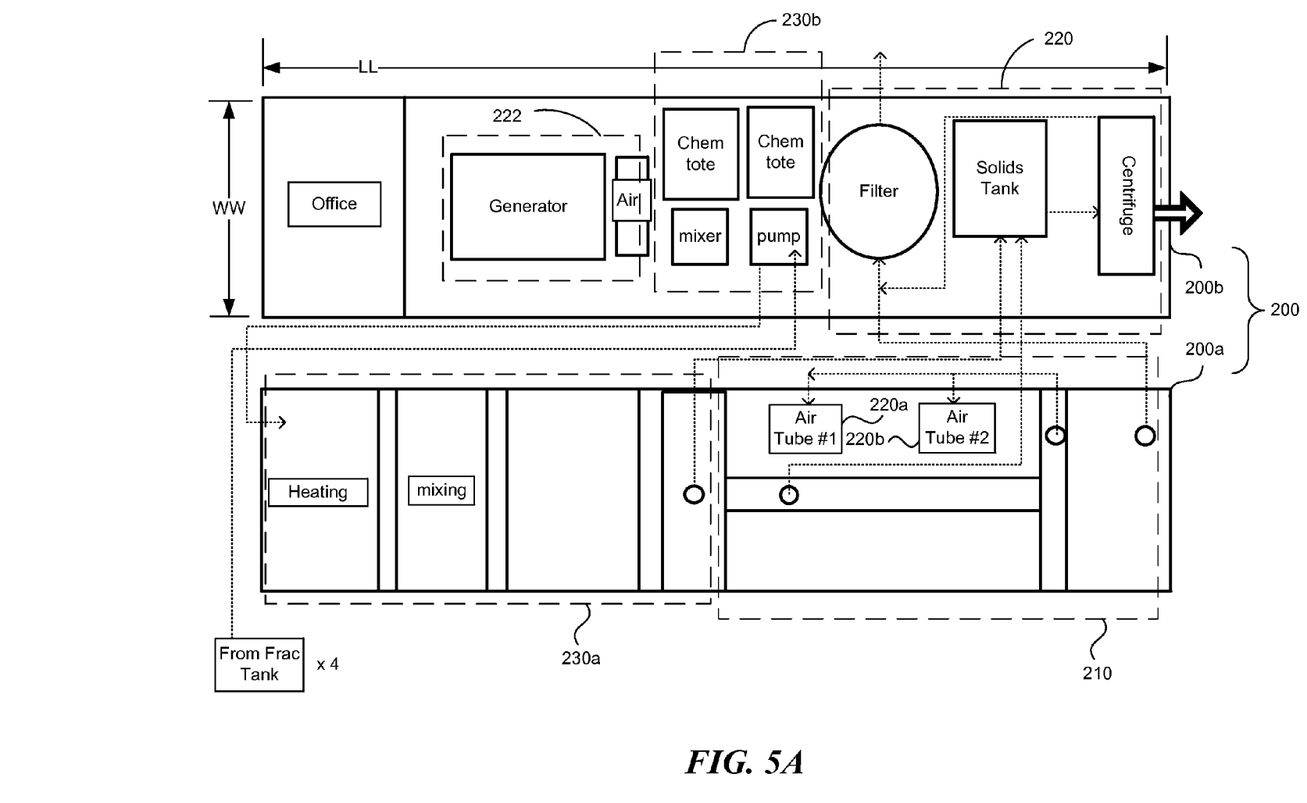
FIG. 5A is a schematic view of a preferred mobile embodiment of a dissolved air flotation filtration system.

Referring again to FIG. 1B, preferred embodiments of the system 10s includes a pre- and post-treatment means for filtration of an influent. In preferred applications of the system 10 for fracking or drilling operations, the system 10 is preferably configured as a mobile system for traveling site to site for on-site treatment of influent water in a manner as previously described. Shown in FIG. 5A is a schematic view of a preferred mobile system 200. The system 200 is mounted about a mobile skid, such as for example, a tractor trailer bed or hauler having a width WW of about eight (8) ft. and a length LL of about 48 ft. More preferably, the system 200 includes a primary skid 200a for housing a preferred flotation cell 210 and other process tanks, such as for example, a pre-treatment flocculation tank 230a. The flotation cell 210 defines a preferred length L of 20 ft. Accordingly, the flocculation tank 230a defines a length of about eight (8) ft.

The system 200 further includes a separate secondary skid 200b for housing processing equipment, such as for example, (i) post-treatment equipment 220 for further filtration of the clarified effluent from the flotation cell 210; (ii) the independent dissolved gas/air-water generators as previously described; and/or (iii) pre-treatment equipment 230b for initial filtration of influent. Exemplary pre-treatment equipment 230b can include chemical totes and mixers for flocculation and a pump for pulling the effluent from one or more holding tanks and in one embodiment from four holding tanks. The pump defines the preferred flow rate of the system 200 to be between 250-600 gallons per minute. The pump pumps the influent into a pre-treatment heating tank followed by a mixing and flocculation tank for initial solids separation before the flotation cell 210. The secondary skid 200b also preferably includes post-treatment filtration using, for example, a solid media filter for filtration of the clarified effluent down to 2 microns.

Figure 5B:
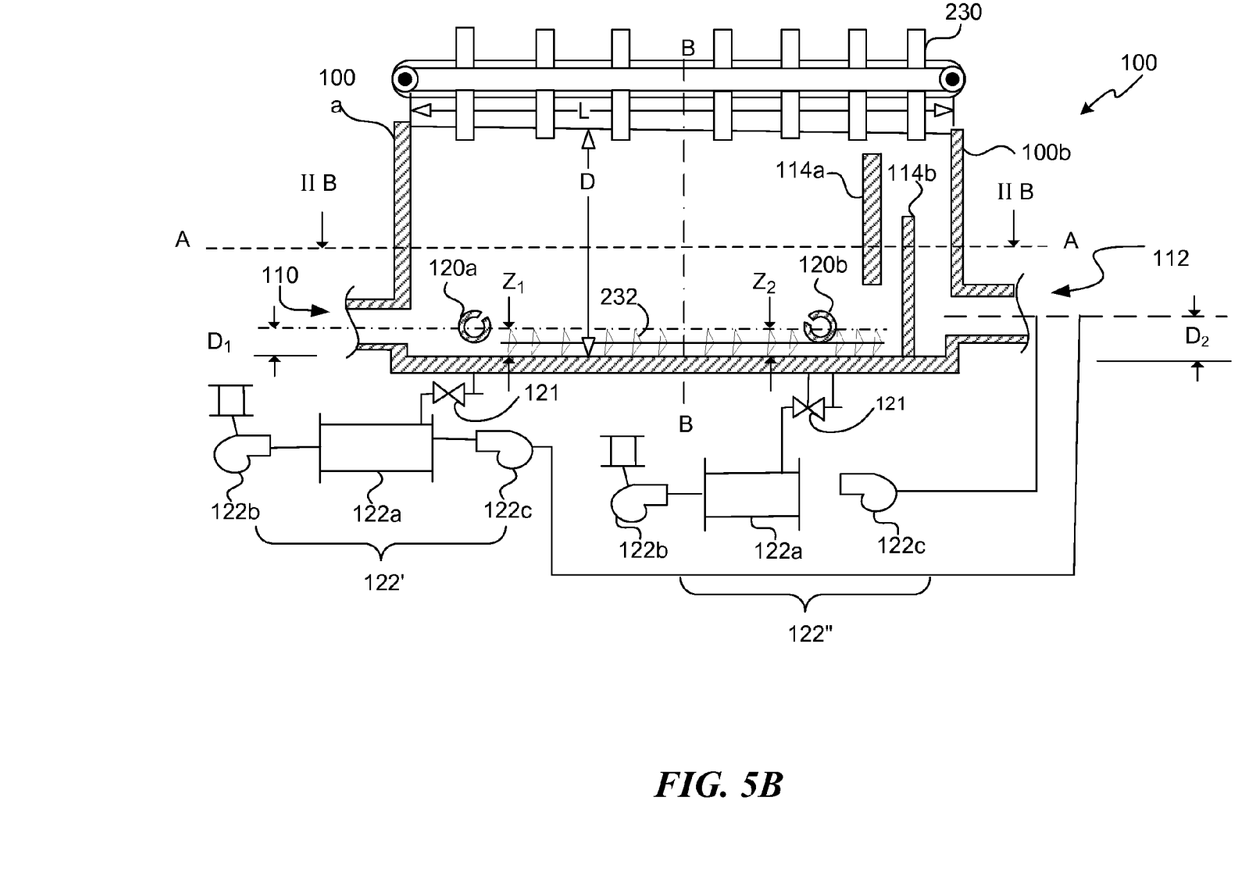
FIG. 5B is a schematic view of a preferred flotation cell for use in dissolved air flotation filtration system of FIG. 5A.

Separated solids are preferably removed to a solids tank disposed on the secondary skid 200b. Water can be further removed by an appropriately sized centrifuge preferably disposed on the secondary skid 200b. Solids removal from the primary skid 200a and flotation cell 210 can be accomplished by gravity or by mechanical means such as for example using feed screws or other material handling equipment. As schematically shown in FIG. 5B, the flotation cell 210 can include a mechanical scraper 230 for removing separated solids from the surface of the effluent. Additionally, the flotation cell can include an auger 232 at the bottom of the cell 210 to remove the heavier solids from the cell. Final clarified water can be returned either to the fracking and/or drilling process for use or conveyed to a separate clarified holding area.

Given the preferred configuration of the DAF systems described herein, it is believed that four 500 barrels (bbl) fracking storage tanks of influent can be processed in 10-12 hours. Moreover, the preferred mobile arrangement provides for a method of assembly and disassembly on-site that is convenient such that separate fracking drilling and/or other processing sites can be treated within days of one another and more preferably with 48 hours. More specifically, the primary and secondary skid haulers 200a, 22b can be coupled as a standard trailer coupled to a truck or trailer. The primary and secondary skids can be coupled together to properly connect the preferred flocculation tank 230a and flotation tank 210 to the pre- and post-secondary processing equipment 220, 222, and 230b previously described. The pump of the preferred pre-treatment equipment can be coupled to the influent source at the site. More preferably, four 500 barrels are filled with influent and coupled to the pump of the pre-treatment equipment 230b. The pump further preferably charges the system, the flocculation tank 230a and the flotation cell 210. Initial set-up and assembly preferably requires one day and more preferably takes 8-12 hours. Processing of the influent in a manner as previously described is treated at a preferred rate of 250-600 GPM over a continuous period of 10-12 hours. Once one site has been processed, the mobile system 10 can be disassembled over a one-day period and more preferably over 8-12 hours transported to a second site for another continuous 10-12 hour of processing. Accordingly, the preferred mobile system 200 can process two-sites each generating 2000 bbl of influent within a 48 hour period.

The above Detailed Description of embodiments of the disclosure is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative combinations or sub-combinations. Each of these processes or blocks may be implemented in a variety of different ways. Also, while processes or blocks are at times shown as being performed in series, these processes or blocks may instead be performed or implemented in parallel, or may be performed at different times.

In conclusion, the present invention provides novel systems, methods and arrangements for automated documentation and negotiation of contracts. While detailed descriptions of one or more embodiments of the invention have been given above, various alternatives, modifications, and equivalents will be apparent to those skilled in the art without varying from the spirit of the invention. For example, while the embodiments described above refer to particular features, the scope of this invention also includes embodiments having different combinations of features and embodiments that do not include all of the described features.

What is claimed is:

1. A dissolved air flotation system comprising
   means for pre-treatment of an influent;
   means for post-treatment;
   a flotation cell having:
      an inlet in communication with the pre-treatment means; and
      an outlet in communication with the post-treatment means, the flotation cell defining a direction of flow along a longitudinal axis extending from the inlet to the outlet, the flotation cell having a top and a bottom to define a cell depth extending from the top of the flotation cell to the bottom of the flotation cell in a direction of a transverse axis transvers to the longitudinal axis;
   a first air/water distribution manifold adjacent the inlet coupled to a first dissolved air generator; and
   at least a second air/water distribution manifold adjacent the outlet coupled to a second dissolved air generator independent of the first air generator, each of the first and second air/water distribution manifolds having a discharge opening defining a discharge axis oriented relative to at least one of the longitudinal axis and the transverse axis to define a discharge of dissolved air and bubble mix having a rate of discharge and a direction, the discharge opening of the second air/water distribution manifold being oriented such that the discharge axis for the second air/water distribution manifold is between an upward vector and an upstream vector.

2. The system of claim 1, wherein the flotation cell defines a length of 20 ft. and a depth of 6 ft.

3. The system of claim 1, wherein at least one of the first and second air/water distribution manifolds has a first end and a second end to define an axial length therebetween, the axial length being oriented perpendicular to each of the longitudinal and transverse axes, the discharge opening comprising an elongated slit extending along the axial length between the first and second ends of the at least one air/water distribution manifold.

4. The system of claim 1, wherein at least one of the first and second air/water distribution manifolds has a first end and a second end to define an axial length therebetween, the axial length being oriented perpendicular to each of the longitudinal and transverse axes, the discharge opening comprising a plurality of opening spaced apart along the axial length between the first and second ends of the at least one air/water distribution manifold.

5. The system of claim 4, wherein each of the plurality of openings defines a substantially circular opening having a diameter of ⅛ to ¼ inches, the circular opening defining a discharge axis defining an included angle ranging from about 35 to about 55 degrees with the longitudinal axis.

6. The system of claim 5, wherein the included angles defined by the discharge axes of plurality of openings are the same.

7. The system of claim 5, wherein the included angles defined by the discharge axes of plurality of openings are different.

8. The system of claim 1, wherein the first air/water distribution manifold and second air/water distribution manifold are spaced apart along the longitudinal axis at a distance of about 16 ft.

9. The system of claim 1, further comprising at least a third air/water distribution manifold between the first and second air/water distribution manifolds.

10. The system of claim 1, wherein the first air/water distribution manifold defines a first rate of discharge ranging from about 75 to about 125 GPM.

11. The system of claim 1, wherein the second air/water distribution manifold defines a second rate of discharge ranging from about 50 to about 75 GPM.

12. The system of claim 1, wherein the each of the first and second dissolved air generators include a tubular chamber having a first inlet coupled to a source of compressed air and a second inlet coupled to a source of water, the air compressed being introduced at a pressure of 125 psi water being introduced through the second inlet at a pressure of 50 to 100 psi.

13. The system of claim 1, wherein the first air/water distribution manifold discharges a saturated air water mixture with bubble sizes at the discharge opening ranging in size from 2 to about 5 microns.

14. The system of claim 1, wherein the first and second air/water distribution manifolds are disposed at a distance of 12 to 24 inches from the bottom of the flotation cell.

15. A flotation cell for use in a dissolved gas flotation system, the flotation cell comprising:
an inlet and an outlet, the flotation cell defining a direction of flow along a longitudinal axis extending from the inlet to the outlet, the flotation cell having a top and a bottom to define a cell depth extending from the top of the flotation cell to the bottom of the flotation cell in a direction of a transverse axis transvers to the longitudinal axis;
first means for discharging a first dissolved gas and bubble mix in a first direction adjacent the inlet; and
second means for discharging a second dissolved gas and bubble mix in a second direction adjacent the outlet, the second direction being between an upward vector and an upstream vector.

16. A mobile dissolved air flotation system comprising:
a primary skid for treating an influent flow ranging from 250-600 GPM, the primary skid including:
a heating chamber;
a flocculation chamber;
a clarified water chamber; and
a flotation cell having an inlet in communication with the flocculation chamber and an outlet in communication with the clarified water chamber, the flotation cell defining a direction of flow along a longitudinal axis extending from the inlet to the outlet, the flotation cell having a top and a bottom to define a cell depth extending from the top of the flotation cell to the bottom of the flotation cell in a direction of a transverse axis transvers to the longitudinal axis, a first air/water distribution manifold adjacent the inlet and at least a second air/water distribution manifold adjacent the outlet, each of the first and second air/water distribution manifold having a discharge opening oriented relative to at least one of the longitudinal axis and the transverse axis to define a discharge of dissolved air having a rate of discharge and a direction the discharge opening of the first air/water distribution manifold is from the inlet to the outlet, the discharge openings of the first air/water distribution manifold and the second air/water distribution manifold being oriented such that at least a portion of the discharge of dissolved air from the second air/water distribution manifold is counter current to at least a portion of the discharged of dissolved air from the first air/water distribution manifold;
a secondary skid including a first dissolved air generator coupled to the first air/water distribution manifold and a second dissolved air generator independent of the first dissolved air generator coupled to the second air/water distribution manifold.

* * * * *